(12) United States Patent
Mizuno et al.

(10) Patent No.: US 6,579,620 B2
(45) Date of Patent: Jun. 17, 2003

(54) WATER-REPELLENT COATING AND COATING FILM

(75) Inventors: Seiichiro Mizuno, Kanagawa (JP); Chiemi Nishi, Tokyo (JP); Yasuhiro Tsukamoto, Tokyo (JP); Masaie Fujino, Kanagawa (JP); Tsutomu Yanagawa, Kanagawa (JP); Takehito Ota, Chiba (JP); Hiroki Yonezawa, Ibaraki (JP); Ken-ichi Takai, Tokyo (JP); Goro Yamauchi, Aichi (JP)

(73) Assignees: NTT Advanced Technology Corp. (JP); Nippon Telegraph and Telephone Corp. (JP)

( * ) Notice: Subject to any disclaimer, the term of this patent is extended or adjusted under 35 U.S.C. 154(b) by 10 days.

(21) Appl. No.: 09/992,604

(22) Filed: Nov. 14, 2001

(65) Prior Publication Data

US 2002/0111402 A1 Aug. 15, 2002

Related U.S. Application Data

(63) Continuation-in-part of application No. 09/281,678, filed on Mar. 30, 1999, now abandoned.

(30) Foreign Application Priority Data

Jul. 31, 1998 (JP) ............................................. 10-217518
Feb. 9, 1999 (JP) ............................................. 11-030772

(51) Int. Cl.[7] ...................... B32B 25/20; B32B 27/32; C08L 27/18; C08L 83/04; C09K 3/18

(52) U.S. Cl. ...................... 428/447; 428/402; 428/421; 428/422; 428/446; 428/451; 524/462; 524/520; 524/544; 524/545; 524/546; 524/588; 106/13; 106/287.13

(58) Field of Search .............................. 428/402, 421, 428/422, 446, 447, 451; 427/199, 204; 524/462, 520, 544, 545, 546, 588; 106/13, 287.13

(56) References Cited

U.S. PATENT DOCUMENTS

| | | | | |
|---|---|---|---|---|
| 4,059,768 A | * | 11/1977 | Van Landeghem et al. | 250/483.1 |
| 4,121,000 A | * | 10/1978 | Wald | 428/35.7 |
| 5,223,562 A | * | 6/1993 | Sagawa et al. | 524/275 |
| 5,510,406 A | * | 4/1996 | Matsuo et al. | 524/237 |
| 5,639,837 A | * | 6/1997 | Farnham et al. | 526/222 |
| 5,917,008 A | * | 6/1999 | Montagna et al. | 528/421 |
| 6,117,555 A | * | 9/2000 | Fujimori et al. | 428/421 |
| 6,225,399 B1 | * | 5/2001 | Araki et al. | 524/544 |
| 2002/0037959 A1 | * | 3/2002 | Colaianna et al. | 524/805 |

FOREIGN PATENT DOCUMENTS

| | | |
|---|---|---|
| JP | 06122838 | 5/1994 |
| JP | 08003479 | 1/1996 |
| JP | 09164353 | 6/1997 |
| JP | 09235506 | 9/1997 |
| JP | 10182189 | 7/1998 |

OTHER PUBLICATIONS

Japanese Office Action dated Jan. 16, 2002 and an English-language translation of the relevant portions.
English-language translation of Japanese Utility Model Application Laid-Open No. Hei 03-094904, claims and Figure descriptions.

* cited by examiner

Primary Examiner—Robert Dawson
Assistant Examiner—Jeffrey B. Robertson
(74) Attorney, Agent, or Firm—Ostrolenk, Faber, Gerb & Soffen, LLP

(57) ABSTRACT

A water-repellent coating has tetrafluoroethylene resin powder, silicone resin binder, and organic solvent. The tetrafluoroethylene resin powder has a ratio of the peak absorbance at 1,800 $cm^{-1}$ to the peak absorbance at 500 $cm^{-1}$ of 0.0001 to 0.05 exclusive. A coating film is formed by applying such a coating on a substrate. The coating has the properties of high water repellency, excellent anti-ice-coating, excellent anti-snow-coating, and so on, in spite of not having a large amount of fluororesin powder. In addition, the coating of film keeps the water repellency regardless of whether the coating film is immersed into water for a long time.

18 Claims, 13 Drawing Sheets

WATER-REPELLENT COATING AND COATING FILM

BACKGROUND OF THE INVENTION

This application is continuation-in-part application of U.S. patent application Ser. No. 09/281,678, now abandoned, filed on Mar. 30, 1999; and, is based on patent application Ser. Nos. 217518/1998 filed on Jul. 31, 1998 in Japan and 030772/1999 filed on Feb. 9, 1999 in Japan, the content of which is incorporated herein by reference.

1. Field of the Invention

The present invention relates to a water-repellent coating and a coating film to be formed by using such a water-repellent coating, especially relates to a coating made of a mixture of a tetrafluoroethylene resin and a silicone resin and a coating film thereof.

2. Description of the Related Art

A water-repellent coating and a coating film thereof have been used in many products that require the characteristics of water repellency, anti-snow-coating, and anti-ice-coating. A representative example of the conventional water-repellent coating is a fluororesin coating as one having the characteristics of excellent weather resistance and stain resistance for use in the fields of building construction, automobile industry, and so on. The conventional fluororesin coating is of single component system using a copolymer of fluoroolefin with a variety of hydrocarbons. A coating film formed by such a coating has a contact angle of about 80° (i.e., the angle which a drop of water forms with a surface of the coating film), resulting in limited water repellency.

In addition, there is a two-component based coating that comprises tetrafluoroethylene as a major constituent thereof which is mixed with a fluororesin (e.g., vinylidene fluoride resin). This kind of the coating provides a coating film with high water repellency as shown by a contact angle of about 150° with water, so that it is nearing practical use. In this case, however, the two-components based coating requires the expensive fluororesin powder in high volume. In spite of its excellent initial water repellency, there are the problems that the characteristics of water repellency, anti-snow-coating, and anti-ice-coating of the coating film can be depressed by subjecting or immersing it in water for a long time.

FIG. 1 is a schematic cross sectional view of the conventional coating film formed using fluororesin binder and fluororesin powder. The coating film comprises a binder 53 applied on a substrate 51. The binder 53 includes fluororesin powder 52. As shown in the figure, some particles of the fluororesin powder 52 are partially exposed out of the surface of the binder 53. In this case, furthermore, we can observe a reduction in the water repellency under the condition of immersing the coating film in water for a long time. It can be caused as a result of water retention in a space 54 between the fluororesin powder 52 and the binder 53 because water can generally enter into such a space 54.

In addition, unevenness occurs as air bubbles exist in the coating film. Depending on the size of the air bubble, several troubles can be caused, for example the surface of the substrate 51 may be exposed out of the coating film and a pin-hole may be formed on the coating film. Therefore, these troubles result in the decline in the qualities of coating film and make an ugly appearance of the coating film.

FIG. 2 is a schematic cross sectional view of a coating film having the air bubbles. A silicone resin binder 62 comprising an abundance of water-repellent particles 61 is applied on a substrate 64. Some particles are insufficiently immersed in the binder 62, as shown in the figure, so that a part of each of them is protruded through the surface of the coating film. If air bubbles are in the silicone resin binder 62, imperfections 63 in the coating film can occurred by the presence of air bubbles when the coating is dip-coated or brush-coated on the substrate 64 or when the applied coating is dried. At least a part of the substrate surface is exposed to the outside, resulting in reduction in the quality of coating film and the loss of the beautiful appearance thereof. In addition, the solids content in the coating is another cause of such troubles. If the solids content is low, the viscosity of the coating is decreased and thus imperfections 65 in the coating film are generated as a result of dropping the solids in the coating film by its own weight during the step of drying.

For keeping the coating film in high water repellency and high anti-ice-coating, the coating film should be prepared using a high purity PTFE resin powder. In addition, a coating should be performed by means of dip-coating or brush-coating when the coating is applied on a complex structure or at a place where fine spray of the coating should not be released into the air. However, the PTFE resin powder has its own surface with low free energies, so that it is difficult to conform the solvent and the resin. As a result, a lot of air bubbles are incorporated into the coating when the PTFE resin powder is dispersed therein. Therefore, air bubbles cause imperfections in the coating film when the coating is dip-coated or brush-coated on the substrate. Depending on viscosity properties of the coating, furthermore, troubles such as imperfections can be caused as a result of dropping the solids in the coating film by its own weight.

SUMMARY OF THE INVENTION

The present invention represents a substantial improvement over the prior art from the perspectives of avoiding the deterioration of water repellency with time. Such deterioration is caused by any alterations to qualities of the binder and the fluororesin powder in a surface of the coating film. The alteration can be caused by the penetration of water into crevices formed between the fluororesin powder and the binder as a result of the difference between their surface free energies and poor wettability.

Therefore, it is an object of the present invention to provide a coating and a coating film prepared by applying such a novel coating on a substrate. The coating is made of a mixture of tetrafluoroethylene resin and silicone resin. The coating has the properties of high water repellency, excellent anti-ice-coating, excellent anti-snow-coating, and so on, in spite of without comprising a large amount of fluororesin powder. In addition, the coating film keeps the water repellency regardless of whether the coating film is dipped into water for a long time.

In a first aspect of the present invention, there is provided a water-repellent coating, comprising:
tetrafluoroethylene resin powder;
silicone resin binder; and
organic solvent, wherein
the tetrafluoroethylene resin powder has a peak absorbance of infrared absorption spectrum approximately at 1,800 $cm^{-1}$ that reflects the presence of a carbonyl group as a terminal group and a peak absorbance approximately at 500 $cm^{-1}$ that reflects C—F bond, where the ratio of the peak absorbance at 1,800 $cm^{-1}$ to the peak absorbance at 500 $cm^{-1}$ is from 0.0001 to 0.05 exclusive.

Here, the silicone binder may be one selected from a group consisting of polyorganosiloxane, fluorinated polyorganosiloxane, and a mixture thereof.

The organic solvent may be one selected from a group consisting of: alcohol solvents, aromatic solvents, aliphatic solvents, and mixtures thereof.

The organic solvent may be one selected from a group consisting of: fluoro solvents, hydrocarbon solvents, ketone solvents, and mixtures of at least two of these solvents.

The ratio of change in specific gravity of the whole may be less than 10%.

The solid content consisting of the tetrafluoroethylene resin powder and the silicone resin binder may constitute 20 to 40% by weight and the organic solvent may constitute 60 to 80% by weight, on the basis of a total weight of the water-repellent coating.

A de-foaming treatment may be performed.

The solids content consisting of the tetrafluoroethylene resin powder and the silicone resin binder may constitute 20 to 50% by weight and the organic solvent may constitute 50 to 80% by weight, on the basis of a total weight of the water-repellent coating.

In a second aspect of the present invention, there is provided a water-repellent coating film to be coated on a substrate, comprising a coating as described herein.

The above and other objects, effects, features and advantages of the present invention will become more apparent from the following description of embodiments thereof taken in conjunction with the accompanying drawings.

DETAILED DESCRIPTION OF THE PREFERRED EMBODIMENTS

Figure 1:
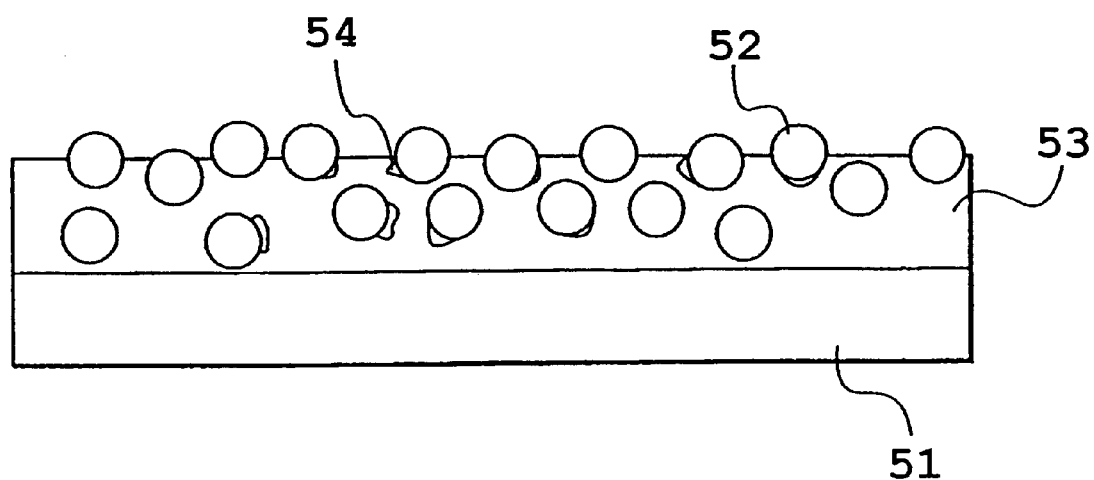
FIG. 1 is a schematic cross sectional view of the conventional coating film.

A water-repellent coating of the present invention is provided as a mixed coating of tetrafluoroethylene resin/silicone resin. The coating comprises tetrafluoroethylene resin powder, a silicone resin binder, and an organic solvent. The tetrafluoroethylene resin powder has a peak absorbance of an infrared absorption spectrum approximately at 1,800 cm$^{-1}$ that reflects the presence of a carbonyl group as a terminal group. The tetrafluoroethylene resin powder also has a peak absorbance approximately at 500 cm$^{-1}$ that reflects C—F bond, where the ratio of the peak absorbance at about 1,800 cm–1 to the peak absorbance at about 500 cm$^{-1}$ is from 0.0001 to 0.05 exclusive. In addition, the silicone binder may be polyorganosiloxane, fluorinated polyorganosiloxane, or a mixture thereof. The organic solvent may be alcohol solvents, aromatic solvents, aliphatic solvents, or mixtures thereof. Alternatively, the organic solvent may be one selected from fluoro solvents, hydrocarbon solvents, ketone solvents, and mixtures of at least two of these solvents.

Furthermore, a coating film of the present invention is provided as a water-repellent coating film coated on a substrate. The coating film is made of a tetrafluoroethylene resin/silicone resin mixed coating. The coating comprises tetrafluoroethylene resin powder, a silicone resin binder, and an organic solvent. The tetrafluoroethylene resin powder has a peak absorbance of an infrared absorption spectrum approximately at 1,800 cm$^{-1}$ that reflects the presence of a carbonyl group as a terminal group and a peak absorbance approximately at 500 cm$^{-1}$ that reflects C—F bond, where a ratio of the peak absorbance approximately at 1,800 cm$^{-1}$ to the peak absorbance approximately at 500 cm$^{-1}$ is from 0.0001 to 0.05 exclusive.

Regarding tetrafluoroethylene (PTFE) resin, water repellency of the coating film can be improved by the fluorination of terminal groups of that resin. The degree of the fluorination on terminal groups of PTFE powder can be evaluated by the ratio of a peak absorbance of an infrared absorption spectrum at a wave number of about 1,800 cm–1 to a peak absorbance at about 500 cm$^{-1}$. We define the degree of fluorination by the following equation (Equation I).

The degree of fluorination on the terminal groups of PTFE powder=(Peak absorbance at about 1,800 cm$^{-1}$/Peak absorbance at about 500 cm$^{-1}$)=Peak ratio.

It becomes possible to minimize the amount of PTFE powder required for attaining a contact angle of 150° by the use of PTFE with partially fluorinated terminal groups. The reduction in the amount of PTFE powder to be used is also effective for cost-reduction of the coating.

The chemical structure of PTFE can be expressed by the following formula.

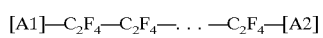

wherein [A1] and [A2] denote terminal groups being positioned on terminals of a long chain of PTFE. It is ideal that the terminal groups are occupied by molecules or groups of carbon-fluorine series (e.g., F and CF$_3$). In actually, these terminal groups may be occupied by hydrophilic groups such as carbonyl groups. In this case, however, water repellency of the coating can be decreased. To work around this problem, the terminal groups of PTFE should be fluorinated by means of, for example vaporization or recrystallization in a fluorine atmosphere to replace carbonyl groups with the carbon-fluorine series. The reaction steps of making PTFE into one having lower molecular weights of 500 to 10,000 and pulverizing it proceed simultaneously with the fluorination step.

The following are effective configurations of the coating composition in accordance with the present invention.

(1) PTFE Powder

It is preferable that PTFE powder has an average particle diameter of 0.1 to 2 $\mu$m and terminal groups that are partially fluorinated by the contact reaction with a fluorinating agent. As described above, the degree of the fluorination on terminal groups of such a low molecular weight PTFE may be expressed as a peak ratio calculated by substituting the peak values of an infrared absorption spectrum into Equation I. It is noted that the preferable peak ratio is from 0.0001 to 0.05 exclusive, preferably from 0.0001 to 0.02 exclusive. When entirely fluorinated to have a peak ratio of 0.0001 or less, the PTFE powder does not have sufficient portions to ensure adhesion to the binder resin. This causes the PTFE powder to remove from the coating film, thereby reducing water repellency of the coating film. According to the present invention, the low molecular PTFE has partially fluorinated terminal groups, so that the water repellency of the coating film increases as the degree of the fluorination increases within the above preferred range, without changes in the amount of the PTFE in the coating.

(2) Silicone Resin Binder

As described above, the silicone resin binder to be used in the present invention is made of one selected from: polyorganosiloxane such as a silicone resin and a silicone rubber, or its partially or entirely fluorinated form (i.e., fluorinated polyorganosiloxane) such as fluoro silicone rubber.

Figure 6:
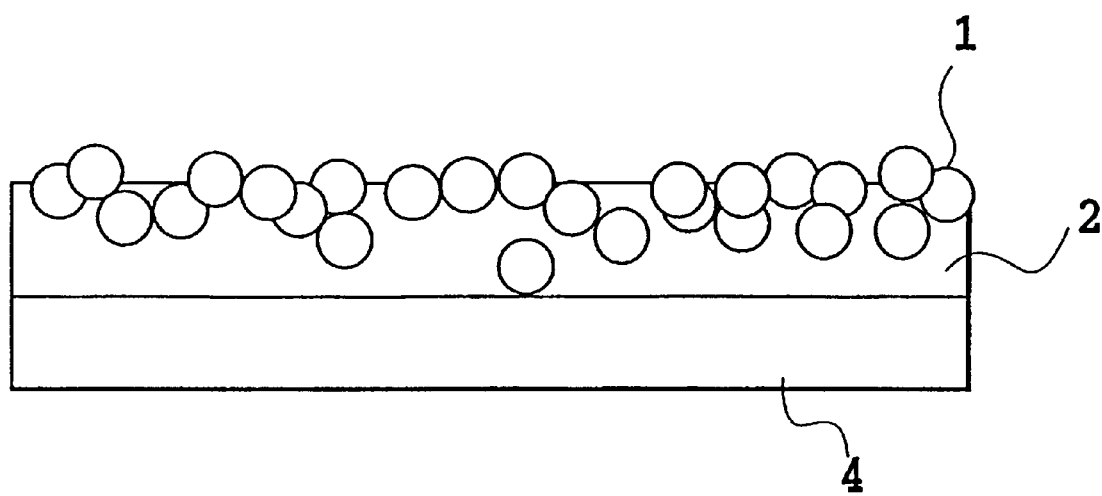
FIG. 6 is a schematic cross sectional view of the coating film in accordance with the present invention.

Referring now to FIG. 6, there is shown a cross sectional view of a coating film. The coating film 2 is formed by applying a coating film comprising the above silicone resin binder and PTFE powder on a substrate 4. As shown in the figure, some particles 10 of the PTFE powder are partially exposed out of the coating film 2. In this case, however, there is no crevice around the particle because of the following reasons.

The silicone resin binder has surface free energies smaller than that of the conventional fluororesin binder. Thus, the difference between the PTFE powder and the silicone resin binder with respect to their surface free energies is small enough to provide good wettabilities and reduce the formation of a crevice between them. Therefore, the binder and the PTFE powder will be less deteriorated, and also water repellency of the coating cannot be reduced in spite of immersing it in water for a long term.

The difference of surface free energies between the PTFE powder and the binder can be evaluated by measuring contact angles or surface tensions. A surface tension of the PTFE resin powder (with a specific gravity of about 2.3) is about 18.5 dyne/cm or less, and the surface tension of the silicone resin binder is about 22.2 dyne/cm which is smaller than those of the other binders. In the present invention, the contact angle which a drop of water forms with a surface of a particle of the PTFE powder is 115°, while the contact angle which a drop of water forms with a surface of the silicon binder is 110°. The difference between those contact angles is small in comparison with that of the conventional one (i.e., a contact angle which a drop of water forms with a surface of the vinylidene fluoride resin is 90°). Alternatively, the surface free energies between the PTFE powder and the silicone resin binder may be evaluated by surface tensions thereof. It means that the silicone resin binder has a good wettability with the PTFE powder. In addition, a small amount of the PTFE powder is required to impart high wet-repellent properties to the coating in contradistinction to the large amount of the conventional fluororesin binder to be required thereto.

(3) Organic Solvent

As described above, the organic solvent may be alcohol solvents such as ethyl alcohol, aromatic solvents such as toluene, aliphatic solvents such as n-heptane, or mixtures thereof. Alternatively, the organic solvent may be one selected from fluoro solvents, hydrocarbon solvents, ketone solvents, and mixtures of at least two of these solvents. It is preferable that the organic solvent has a surface tension of 16 to 22 dyne/cm and a specific gravity of 0.6 to 1.6 at 25° C. As the surface free energies of the PTFE resin powder of the present invention is significantly small, it is preferable that the surface free energies of the organic solvent is also small enough to make a high conformability of the PTFE resin powder in the coating composition in addition to decrease the changes in specific gravity of the coating as a whole. Regarding the specific gravity, as described above, the organic solvents of the present invention may have specific gravities of 0.6 to 1.6 which are small in comparison with those of the other organic solvents used in the conventional coating compositions. According to the present invention, therefore, the difference between the specific gravity of the organic solvent and the specific gravity of the silicone resin is small. However, the water-repellent powder is settled out at a faster than normal speed if the difference between them is high, resulting in a poor workability of dip-coating or brush-coating. It is noted that a mixture of the organic solvents of the present invention has a specific gravity of 0.6 to 1.6 at 25° C. as an acceptable level to disregard the above difference. Thus, the mixed organic solvent does not cause the problems in which the powder precipitates out of the coating.

(4) Solids Content

The solids content of the coating consists of the PTFE resin powder and the silicone resin binder. Regarding the proportion of these ingredients, it is preferable to comprise 40 to 50% of the PTFE resin powder and 50 to 60% of the silicone resin binder on the basis of the total volume of the solids.

Figure 3:
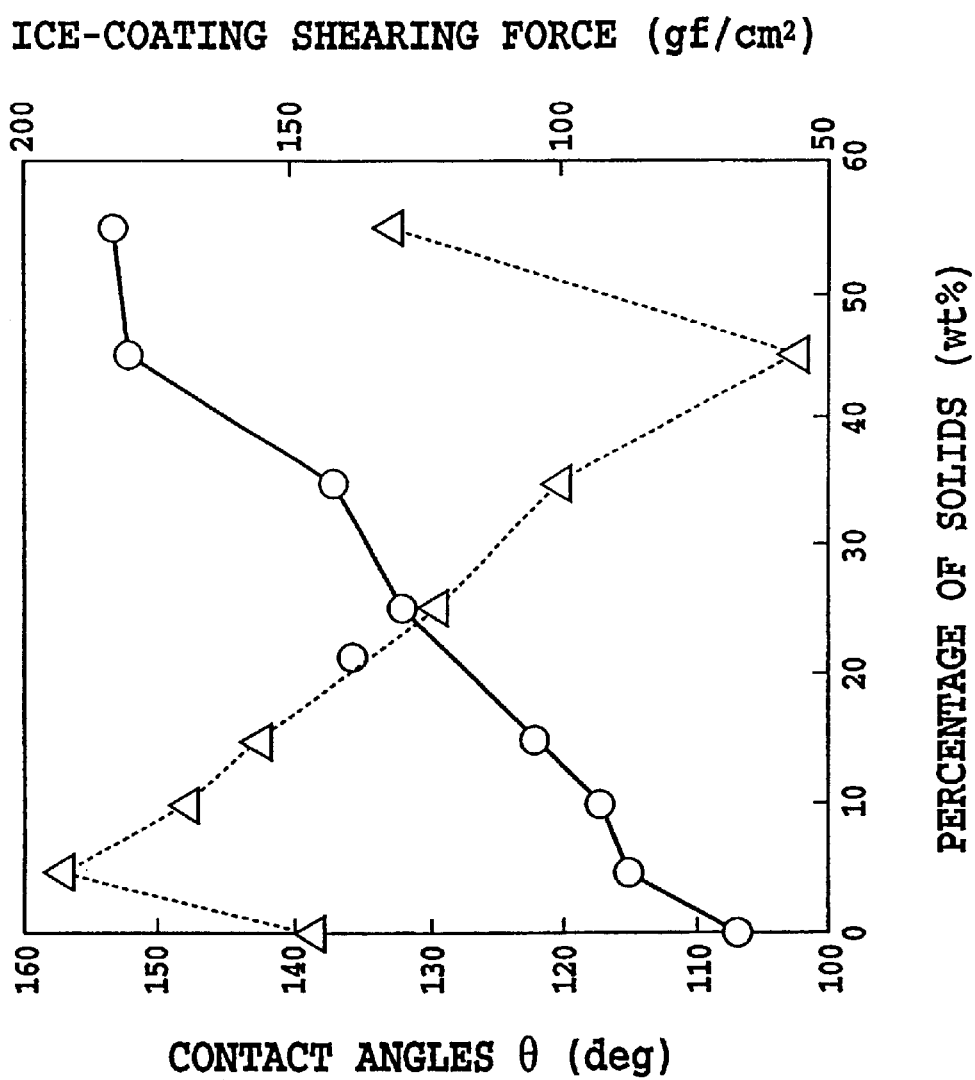
FIG. 3 is a graph representing the relationship between the content (% by weight) of PTFE resin powder in the solids and the contact angles (degree) or the ice-coating shearing force (gf/cm$^2$) with respect to the conventional coating.

FIG. 3 shows the changes in contact angles (symbolized by circles) and ice-coating shearing forces (symbolized by triangles) in response to changes in the amount of the PTFE resin powder in the range of 5% to 55% on the basis of the total volume of the solids content.

The water repellency and anti-ice-coating of the coating film can be evaluated by the following methods.

The contact angle θ of water is well known in the art as an index of water repellency. The higher contact angle observed, the higher water repellency obtained. In the examples and comparative examples, a contact angle is determined by dropping 4 $\mu$l ($4 \times 10^{-9} m^3$) of deionized water on a dry coating film surface prepared by applying a water-repellent coating and measuring a contact angle θ using an automatic contact angle meter manufactured by KYOWA KAIMEN KAGAKU CO., LTD at a room temperature (23° C.). The measurement is repeated five times for each sample and the mean value of all the five results is used. As shown in FIG. 3, the higher the amount of the TF resin powder in the solids content, the higher is the contact angle observed. Further, the higher the contact angle, the higher is the water repellency obtained. Thus, the amount of the PTFE resin powder in the coating should be increased enough to attain the excellent water repellency of the resulting coating film.

Figure 4:
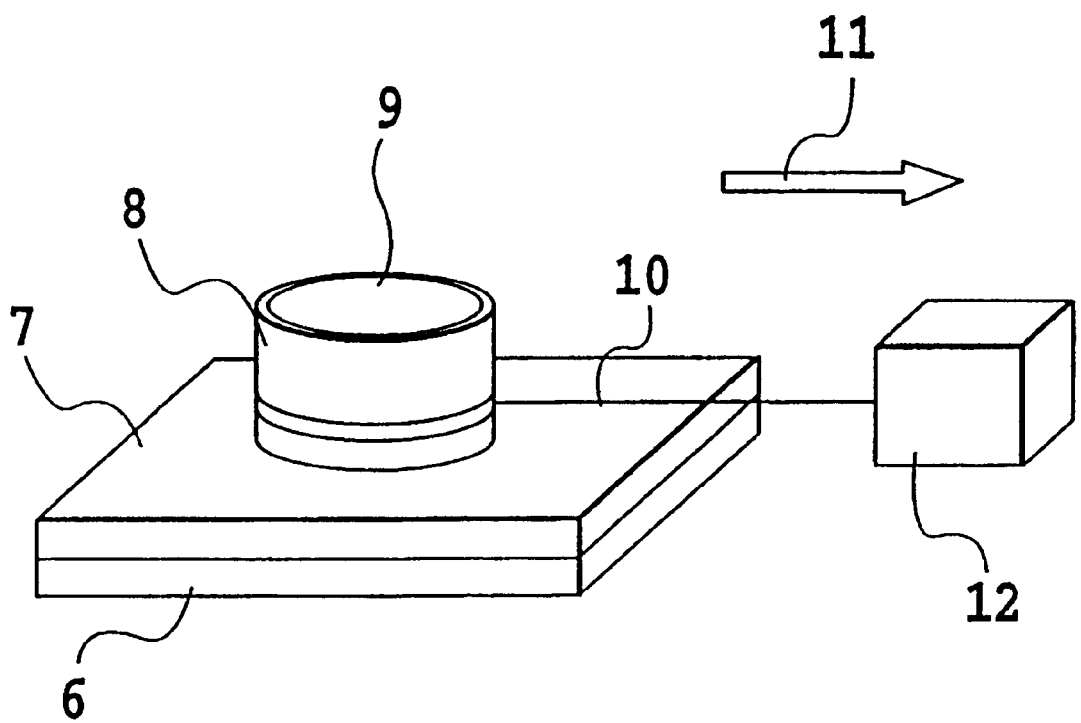
FIG. 4 shows a schematic diagram of an arrangement for evaluating ice-coating shearing force.

Anti-ice-coating properties of the coating films are evaluated by measuring an ice-coating shearing force of the coating film by means of a tester assembly shown in FIG. 4. The tester assembly comprises a cylindrical-formed Teflon ring 8 with a diameter of 32 mm on a surface of a coating film 7 applied on a substrate 6, ice 9 being surrounded by the ring 8, a stainless steel wire 10 for pulling the ring 8 in the direction 11 parallel to the coating film 7, and load cell 12. The load cell 12 imposes dynamic loads on the ring 8 through the wire 10 to pull the ring 8 in a predetermined direction at a constant speed and measures the changes in loads until the ice is moved. An ice-coating shearing force is defined as the maximum load just before the ice 9 is moved. The measurement is performed at a temperature of −5° C. The measurement is repeated three times for each sample and the mean value of all the three results is used. The smaller ice-coating shearing force is obtained, the higher anti-ice-coating property is obtained.

As shown in FIG. 3, the ice-coating shearing force becomes small in response to an increase in the proportion of PTFE resin powder in the solids content. It means that anti-ice-coating property is high when the ice-coating shearing force is small. Thus, there is a necessity to increase the PTFE resin powder content for sufficiently expressing the anti-ice-coating property of the coating film. The ice-coating shearing force is dramatically increased when the PTFE resin powder makes up 55% of the total volume of the solids content. This is a consequence of the increase in surface roughness of the coating film in response to the increase in the PTFE resin powder content. That is, the rough surface of the coating film acts as an anchor to increase the ice-coating shearing force. Therefore, it is preferable that the proportion of the PTFE resin powder in the solids content is in the range of 40 to 50% on the basis of the total volume of the solids content.

In the case that a coating is prepared by the process without any de-foaming treatment, the proportion of the solids content in the coating (hereinafter, also referred as "solids fraction") is in the range of 20 to 40% by weight and the proportion of the organic solvent in the coating (hereinafter, referred as "solvent fraction") is in the range of 60 to 80% by weight, on the basis of the total weight of the coating. In the case that a coating is prepared by the process including the de-foaming step, the solids fraction is preferably in the range of 20 to 50% by weight and the solvent fraction is preferably in the range of 50 to 80% by weight, on the basis of the total weight of the coating.

Figure 5:
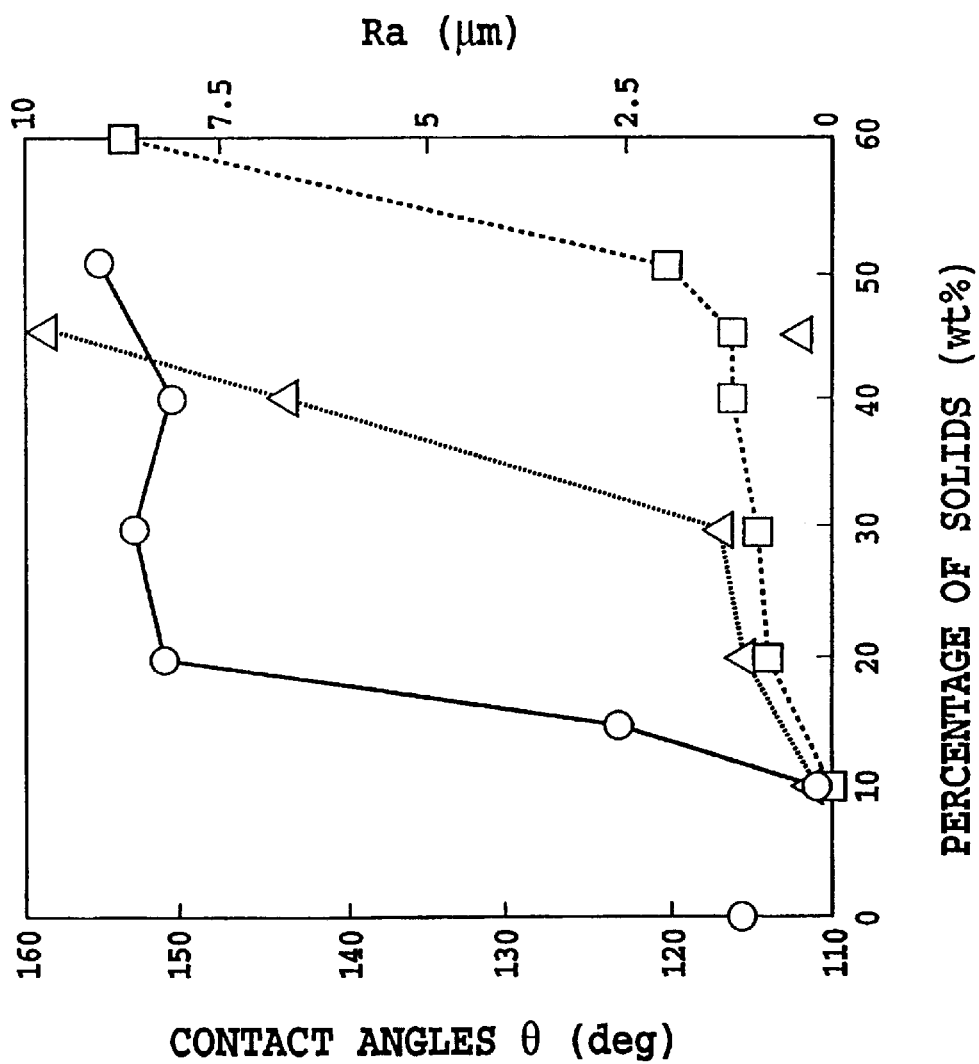
FIG. 5 is a graph representing the relationship among the solids content, the contact angles, and the arithmetical mean surface roughness of the coating.

FIG. 5 shows the variations in arithmetical mean surface roughness Ra and contact angles of a coating film in response to the variations in the solids fraction in the range of 10 to 60% by weight. In the figure, contact angles are indicated by circles, Ra values (with de-foaming treatment) are indicated by squares, and Ra values (without de-foaming treatment) are indicated by triangles.

The coating film is formed by dip-coating on an aluminum substrate and includes 50% of PTFE resin powder.

The arithmetical mean surface roughness Ra is known as an index of surface roughness, where a surface of the coating film is smoothed in proportion to the decrease in the Ra value. The arithmetical mean surface roughness Ra is measured using a surface roughness tester commercially available from Tokyo Seimitsu Co., LTD. The measurement is performed on a coating film and repeated three times for each sample. The mean value of all the three results is used.

Figure 2:
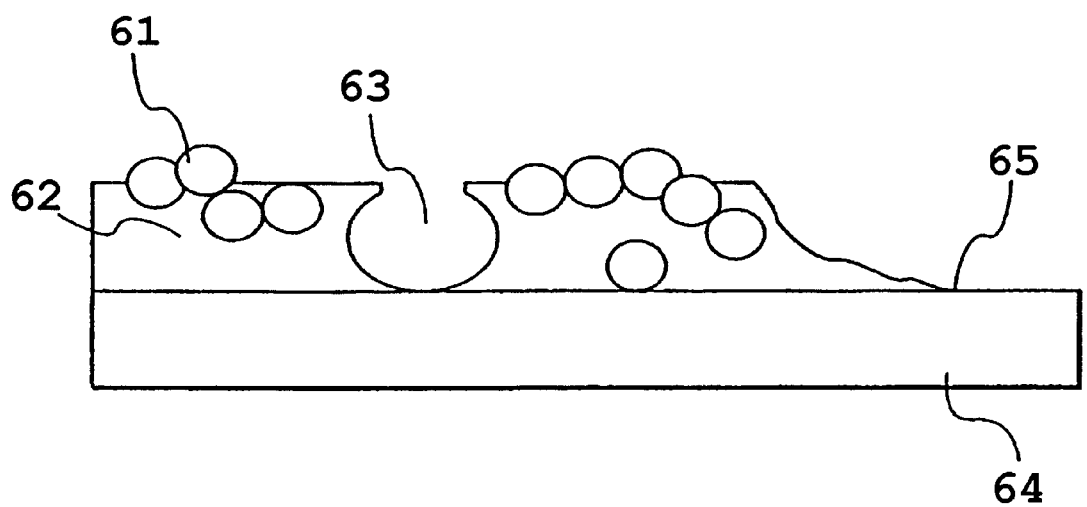
FIG. 2 is a schematic cross sectional view of another conventional coating film.

The solids fraction should be 20% by weight or over for sufficiently expressing the water repellency of the coating film because of the following reasons. That is, the solids tend to drop into the applied coating by their own weight if the viscosity of the coating is low. Thus, an area of imperfections 5 on the coating film can be extended as shown in FIG. 2, resulting in poor water repellency. For sufficiently expressing the water repellency, therefore, the solids fraction should be 20% by weight or over.

In addition, the solids fraction should be 40% (for the coating without de-foaming treatment) or 50% (for the coating with de-foaming treatment) by weight at the maximum because of the following reasons. That is, the weight percentage of the water-repellent powder in the coating becomes high if the solid fraction is higher than the above maximum value. Thus, a lot of air bubbles may be easily incorporated into the coating during the step of applying the coating on a substrate. The air bubbles increase the number of imperfections 3 in the coating film as shown in FIG. 2 and cause asperities on the surface, resulting in the increase in the Ra. The smoothness of the surface becomes lost as the Ra increases, so that the ice-coating shearing force becomes high as a result of the anchoring effect described above. For obtaining the surface smoothness, therefore, the solids fraction should be 40% by weight or less when the coating is not subjected to the de-foaming treatment, or 50% by weight or less when the coating is subjected to the de-foaming treatment.

Rate of change in specific gravity of the whole coating may be 10% or less. In addition, a de-foaming treatment is performed in the process of manufacturing the coating.

The coating is manufactured by the process including the following steps:

PTFE resin powder to be used is pre-dispersed into an organic solvent. In this step, coagulated particles of the PTFE resin powder are dispersed and most of air bubbles in the coagulated population are removed, followed by adding a silicone resin binder into the mixture of PTFE powder and organic solvent to make a substantially dispersed mixture. It is preferable to perform a de-foaming treatment as a final step whether or not most of the air bubbles are removed. For avoiding having lot of air bubbles incorporated into the coating during the steps of pre-dispersion or substantial dispersion, the organic solvent may be selected from alcohol solvents such as ethyl alcohol, aromatic solvents such as toluene, aliphatic solvents such as n-heptane, or mixtures thereof. Alternatively, the organic solvent may be one selected from fluoro solvents, hydrocarbon solvents, ketone solvents, and mixtures of at least two of these solvents. It is preferable that the organic solvent has a surface tension of 16 to 22 dyne/cm and a specific gravity of 0.6 to 1.6 at 25° C.

The de-foaming treatment can be performed by subjecting a coating composition to a reduced pressure. That is, the coating composition is placed in a desiccator with decompression means and gradually depressed. Air bubbles in the coating gradually increase in size as the magnitude of the decompression increases. Subsequently, the air bubbles move upward of the coating and then they burst in the air, resulting in the removal of air bubbles from the coating. The resulting coating has the percentage of change in specific gravity depending on air bubbles in the coating in the range of 10% or less.

The percentage of change in specific gravity can be expressed by the following equation (II):

$$\text{Percentage of change in specific gravity} = \frac{\text{Theoretical specific gravity} - \text{Apparent specific gravity}}{\text{Theoretical specific gravity}} \times 100 \qquad (II)$$

The theoretical specific gravity can be calculated using a specific gravity of each constituent and the ratio of the constituents. If there is no air bubble in the coating, the theoretical specific gravity and the apparent specific gravity of the coating are equal, resulting that the percentage of change in specific gravity is zero percent. The coating includes air bubbles in actual fact, so that the apparent specific gravity is small as compared with the theoretical specific gravity. Therefore, the percentage of change in specific gravity becomes small as the number of the air bubbles decreases.

Moreover, when the change in specific gravity is greater than 10%, sedimentation of the PTFE powder occurs by its own weight so that it is difficult to obtain an appropriate coating composition. Furthermore, even though the coating composition has been made with assistance of a stirring apparatus, the PTFE powder also settles down when coated onto a substrate, so that the resulting coating film is not acceptable.

A water-repellent coating film of the present invention is prepared by dip-coating or brush-coating the coating described above on a substrate. The resulting coating film is characterized by a contact angle of 150° or over and an ice-coating shearing force of 150 gf/cm$^2$(1500 kg/m$^2$) or less. The surface of the coating film is smooth with its arithmetic mean surface roughness of 5 μm or less.

Referring again FIG. 6, a silicone resin binder 2 is applied on a substrate 4 and includes an abundance of water-repellent particles 1. Microscopically, some of the water-repellent particles 1 are partially exposed from the surface of the silicone resin binder 2. In this case, imperfections such as asperities and pin holes are not observed in the coating film, so that the coating film provides an extremely smooth surface from a macroscopic viewpoint. In addition, the coating may be applied on the substrate not only by means of dip-coating and brush-coating but also air-spray coating or the like.

Accordingly, as described above, a coating film formed using the coating of the present invention has a high water repellency, so that it can be used in many articles that require the characteristics of water-repellency, anti-snow-coating, and anti-ice-coating. In addition, the coating film can be used in many complicated articles such as an inner wall of a tube, a fin of a heat exchanger, and a net. Furthermore, the coating film can be also used in an air-spray coating at a place where fine spray of the coating should not be released into the air.

EXAMPLE 1

For recognizing the effectiveness of the present invention, a sample of the present example is prepared as follows.

First, a binary mixture is prepared as the solids content. The mixture comprises: 45% by volume of PTFE powder (peak ratio=0.01) with a particle size of 0.88 m and an average molecular weight of 5,000 in which the extent of fluorination to terminal groups thereof is high; and 55% by volume of polyorganosiloxane resin. Then, 35% by weight of the binary mixture is blended with n-heptane using a ball mill, resulting in a coating composition (i.e., a tetrafluoro-ethylene resin/silicone resin-mixed coating). The resulting coating is applied on a slide glass by means of spray-coating to make a coating film as Sample 1.

EXAMPLE 2

A coating composition is prepared and applied on a slide glass to make a coating film as Sample 2 by the same way as that of Example 1 except that used was PTFE powder (peak ratio=0.05) in which the extent of fluorination to terminal groups thereof is not high.

Comparative Example 1

A coating composition is prepared as follows.

First, a binary mixture is prepared as the solids content. The mixture comprises: 45% by volume of PTFE powder which is the same one as that of Example 1; and 55% by volume of vinylidene fluoride resin. Then, 35% by weight of the binary mixture is blended with n-heptane using a ball mill, resulting in a coating composition (i.e., a tetrafluoro-ethylene resin/resin-mixed coating). The resulting coating is applied on a slide glass by means of spray coating to make a coating film as Comparative sample 1.

Comparative Example 2

A coating composition is prepared as follows.

First, a binary mixture is prepared as a solids content. The mixture comprises: 80% by volume of PTFE powder which is the same one as that of Example 1; and 20% by volume of vinylidene fluoride resin. Then, 35% by weight of the binary mixture is blended with n-heptane using a ball mill, resulting in a coating composition (i.e., a tetrafluoroethylene resin/resin-mixed coating). The resulting coating is applied on a slide glass by means of spray coating to make a coating film as Comparative sample 2.

The following table is a list of the main constituents of each of Examples 1 and 2 and Comparative Examples 1 and 2.

TABLE 1

|  | PTFE Powder addition amount (% by volume) | PTFE Powder degree of fluoridation to terminal group | Binder resin |
| --- | --- | --- | --- |
| Sample 1 | 45 | 0.01 | Silicone |
| Sample 2 | 45 | 0.05 | Silicone |
| Comparative sample 1 | 45 | 0.01 | Vinylidene |
| Comparative sample 2 | 80 | 0.01 | Vinylidene |

In Table 1, the degree of fluorination to the terminal group of PTFE powder is given by the equation 1 for mathematical calculations on an infrared absorption spectrum of the PTFE powder.

Figure 7:
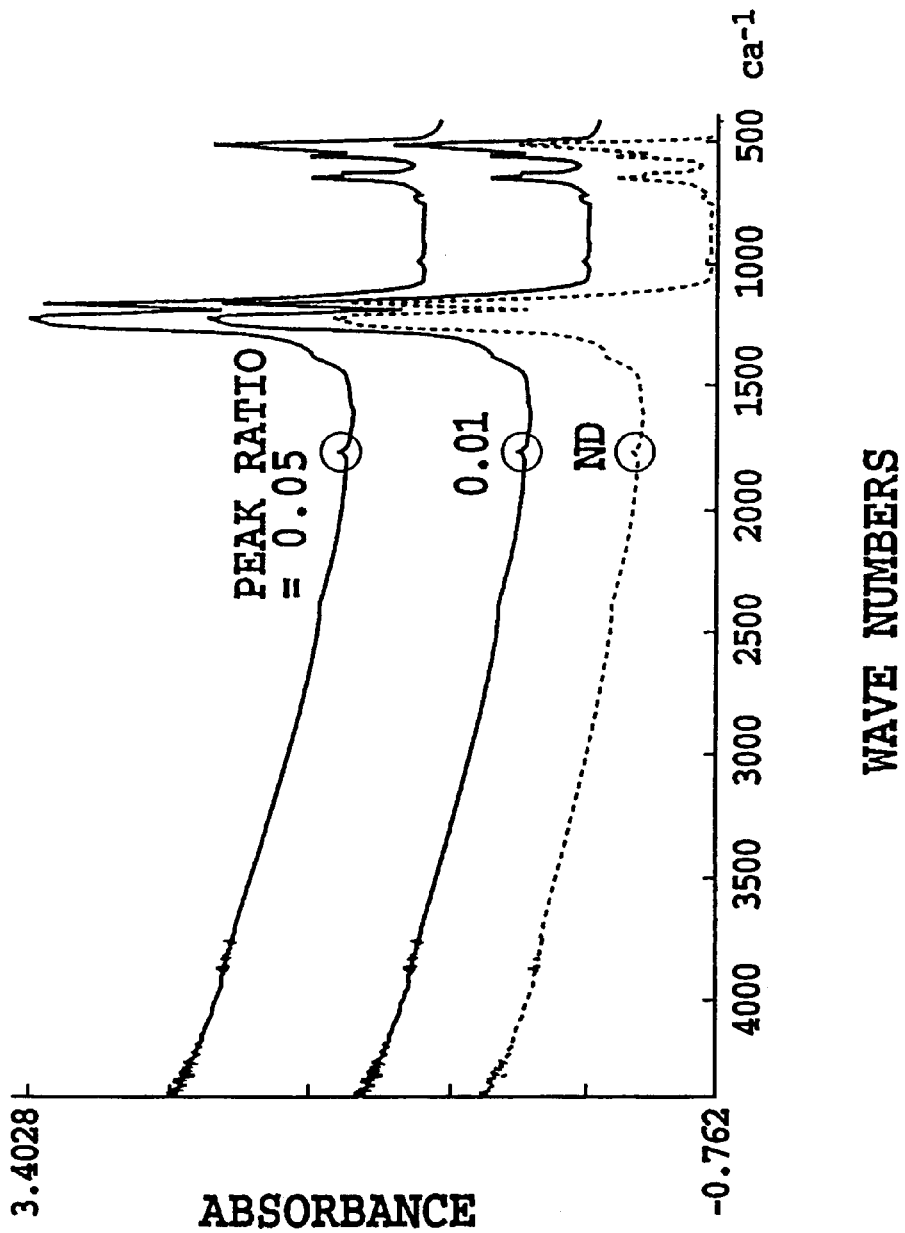
FIG. 7 is a graph representing an infrared absorption spectrum of tetrafluoroethylene at wave numbers of 500 to 4,000 cm$^{-1}$.
Figure 8:
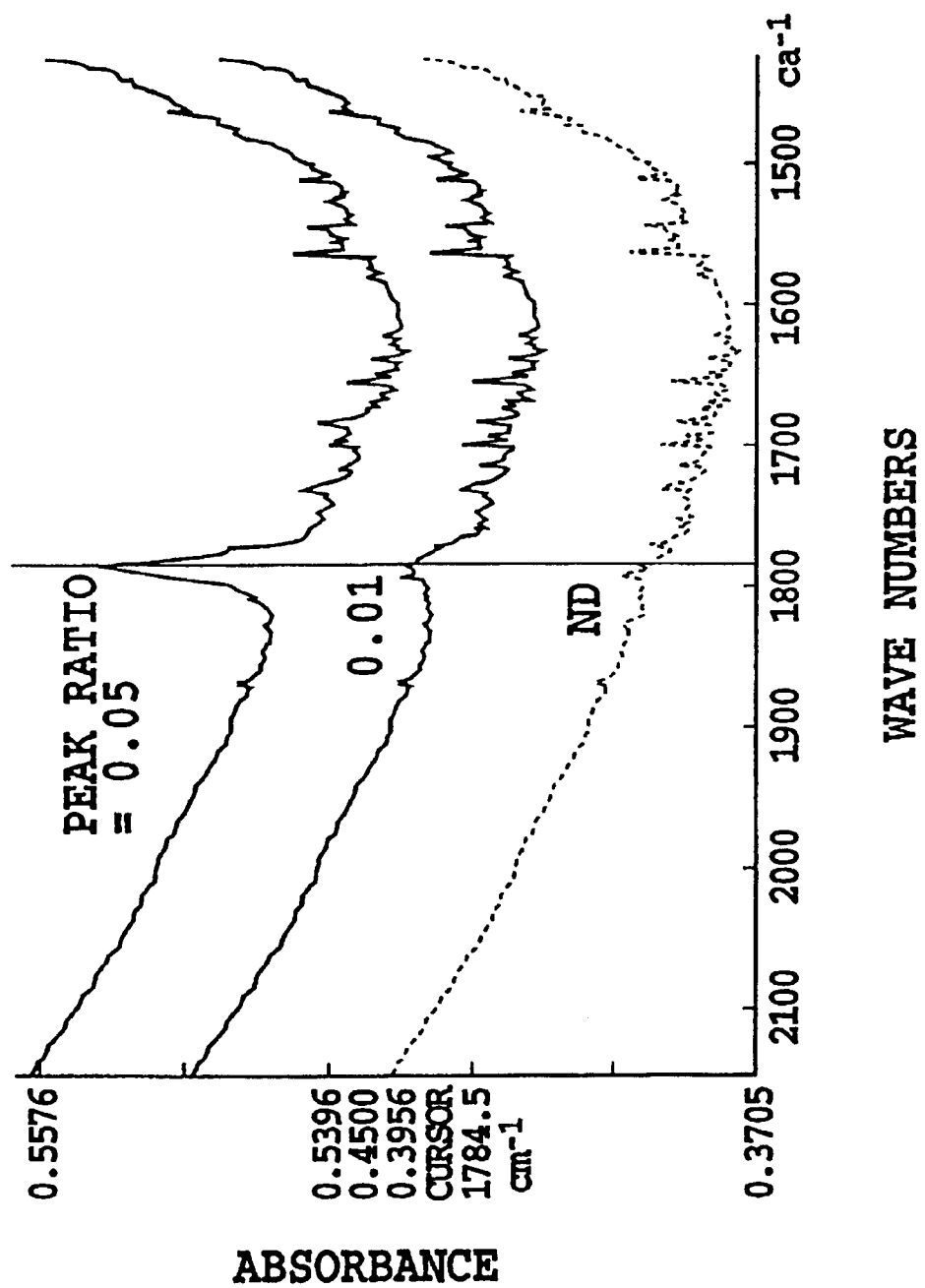
FIG. 8 is a graph representing an infrared absorption spectrum of tetrafluoroethylene at a wave number of 1,800 cm$^{-1}$.

FIG. 7 shows an infrared absorption spectrum of tetrafluoroethylene, in which a lateral axis indicates wave numbers of infrared ray and a vertical axis indicates the intensity of infrared absorption. The curves correspond to the results of measurement on three different samples, respectively. Each number on the curves represents the peak ratio as the degree of fluorination to terminal group of the PTFE powder, which is given by Equation I described above. FIG. 8 is a magnified view of a part of the spectrum measured at the wave number of around 1,800 cm$^{-1}$. As the fluorination of terminal groups of the PTFE powder proceeds, the peak value around 1,800 cm$^{-1}$ becomes smaller as a result of a replacement reaction of the carbonyl group which existed as a terminal group. Regarding the degree of fluorination of the PTFE powder, each of Sample 1 and Comparative samples 1 and 2 has a peak ratio of 0.01 and Sample 2 has a peak ratio of 0.05. In the figure, "ND" means that a peak value cannot be detected because the fluorination proceeds over the sensitivity of the measurement equipment.

Figure 9:
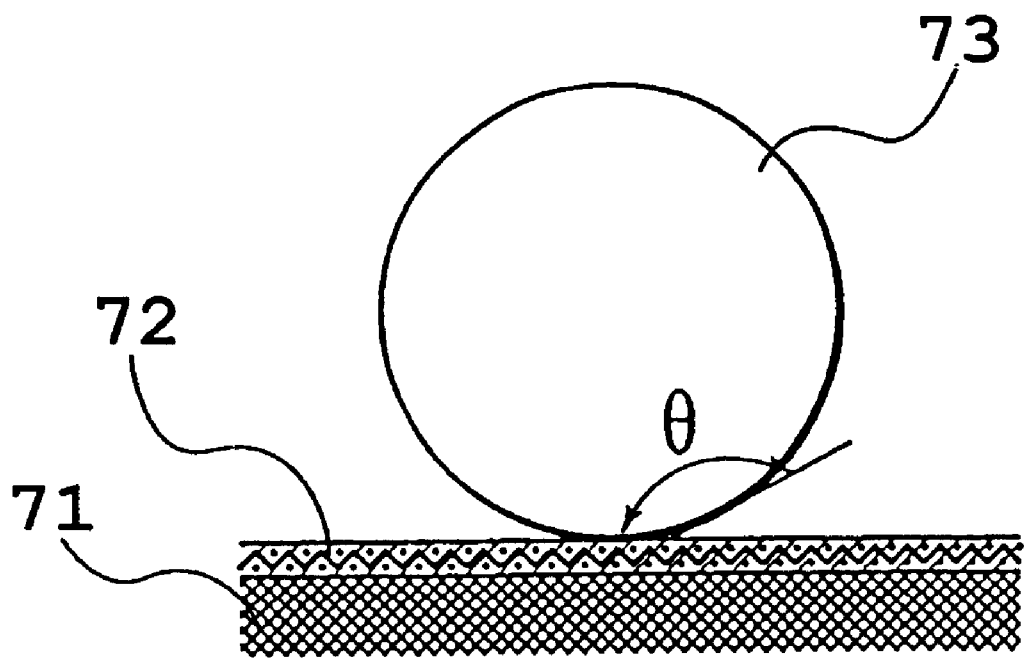
FIG. 9 is a schematic cross sectional view of the coating film on which a drop of water is being placed.

FIG. 9 is a schematic diagram of a drop of water on a coating film. As shown in the figure, a drop of water 73 is placed on a coating film 72 applied on a substrate 71. The contact angle which a drop of water 73 forms with a surface of the coating film 72 is indicated by "θ". Water repellency of each sample is evaluated in comparison with those of others from the measurement on contact angle θ.

Characteristics of the coating films of Examples and Comparative Examples are shown in Table 2. In the table, initial water repellency is represented as an initial contact angle, water repellency after immersing in water 200 days is represented as a contact angle after immersing in water 200 days, and initial anti-ice-coating property is represented as a ice-coating shearing force.

TABLE 2

|  | Initial Contact angle (degree) | After 200 days Contact angle (degree) | Shear force (gf/cm$^2$) |
|---|---|---|---|
| Sample 1 | 152 | 140 | 112 |
| Sample 2 | 124 | 95 | 205 |
| Comparative sample 1 | 128 | 74 | 552 |
| Comparative sample 2 | 152 | 120 | 381 |

The contact angle θ of water has been well known in the art as an index of water repellency. The higher the contact angle, the higher water repellency is observed.

In the examples and comparative examples, a contact angle is determined by dropping 4 μl (4×10$^{-9}$ m$^3$) of deionized water on a dry coating film surface prepared by applying a water-repellent coating and measuring a contact angle θ by the method using automatic contact angle meter of CA-Z model manufactured by KYOWA KAIMEN KAGAKU CO., LTD at room temperature (23° C.). The measurement is repeated five times for each sample and the mean value of all the five results is listed as a contact angle in the following Table 3. In Table 3, the contact angle is evaluated before or after immersing the coating film in water for 200 days.

TABLE 3

|  | Contact angle of coating film before or after immersing in water | |
|---|---|---|
|  | before | after |
| Sample 1 | 152° | 140° |
| Sample 2 | 124° | 95° |
| Comparative Sample 1 | 128° | 74° |
| Comparative Sample 2 | 152° | 120° |

As shown in the table, both Sample 1 and Comparative Example 2 have excellent water repellencies.

Figure 10:
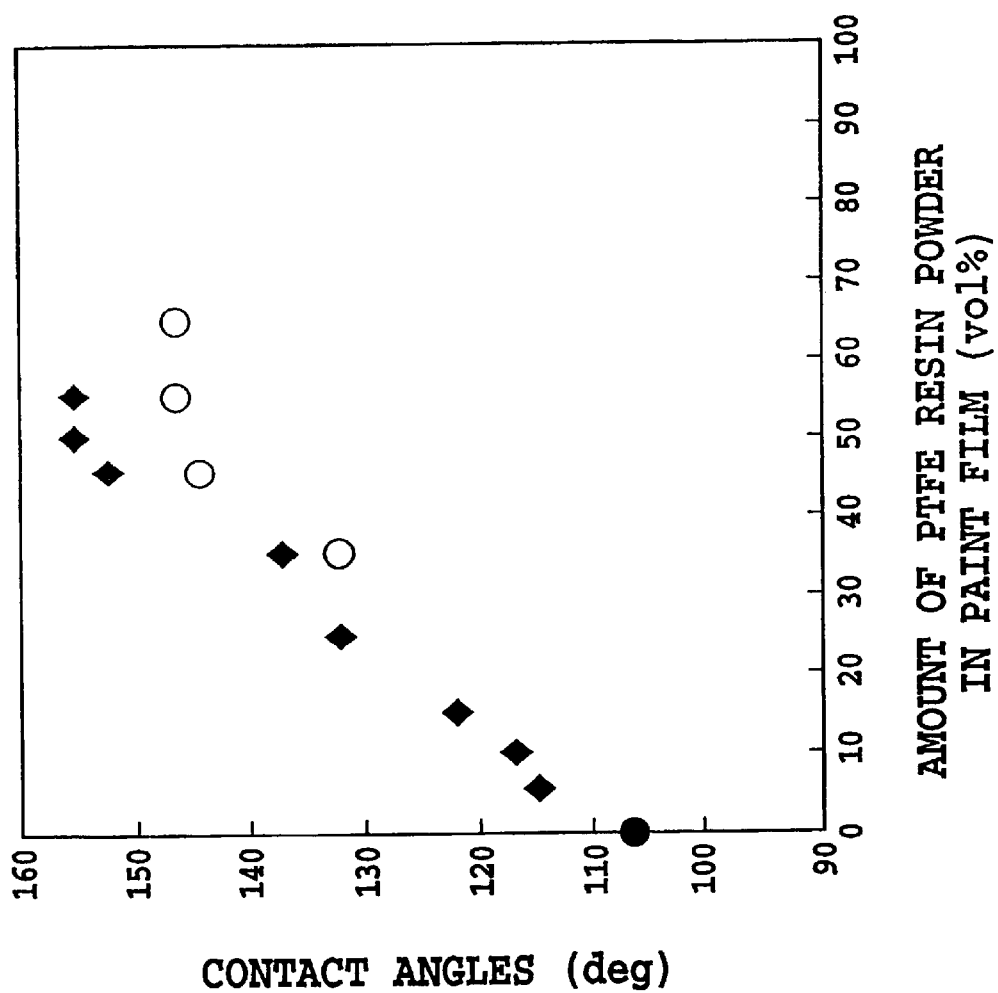
FIG. 10 is a graph representing the relationship between the contact angles and the additional amounts of PTFE.

FIG. 10 is a graph that shows the relationship between the water repellency and the content of PTFE resin powder in the coating film. In the figure, the relationship between a contact angle (deg) for water and an additional amounts of PTFE is evaluated with respect to one of PTFE resin powder having a high level of fluorination of an end group (i.e., Sample 1, peak ratio=0.01, indicated by rhombuses) and PTFE resin powder (volume %) having an acceptable level of fluorination of an end group not higher than that of Sample 1 (i.e., Sample 2, peak ratio=0.05, indicated by circles).

The PTFE resin powder of Sample 1 provides a higher contact angle compared with that of Sample 2 in spite of their equal content. Therefore, it means that we can attain high water repellency through the use of the PTFE resin powder in low volume with the high level of fluorination of end group.

Figure 11:
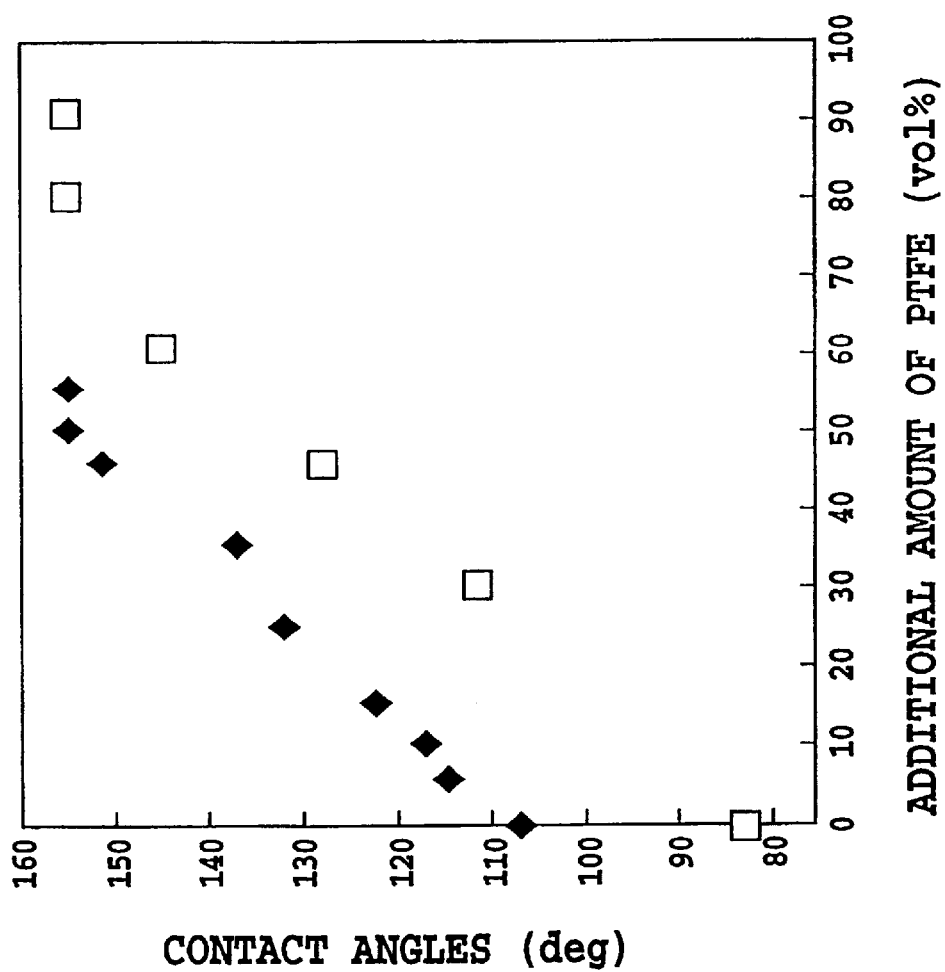
FIG. 11 is a graph representing the relationship between the additional amounts of PTFE resin powder and the contact angles with respect to the coating films using the present binder and the conventional binder, respectively.

FIG. 11 shows the relationship between the addition amount of PTFE powder (volume %) in the coating film and the contact angle (deg) which the surface of coating film forms with a drop of water, where the PTFE powder has a high level of fluorination of end group. In the figure, two samples are plotted on the graph, in which one is a coating film of Sample 1 using a silicone resin as its binder (indicated by rhombuses) and the other is a coating film as a comparative sample using a vinylidene fluoride resin (indicated by boxes).

Comparing with the vinylidene fluoride resin, the silicone resin is provided as a binder and makes the coating film more water-repellent, which is almost the same level as that of the coating film having fluororesin coating prepared by mixing a large amount of fluororesin powder with a vinylidene fluoride resin. For example, a coating film formed using a vinylidene fluoride resin requires 80% or more of PTFE powder to obtain a contact angle of 155°.

According to present embodiment, on the other hand, only 50% or more of PTFE powder may be required, so that the present embodiment is able to provide a cost-effective coating by minimizing the use of expensive PTFE powder.

Figure 12:
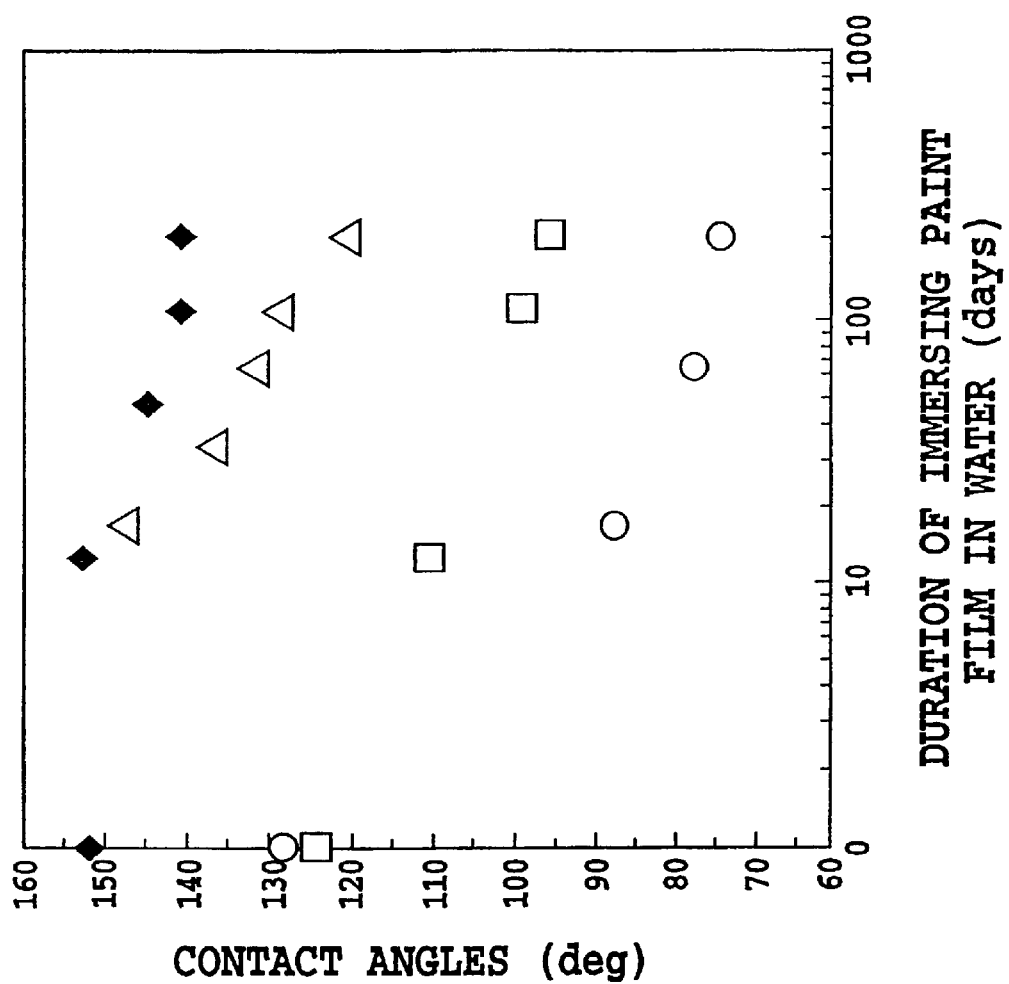
FIG. 12 is a graph representing the relationship between the duration (days) of immersing the coating film in water and the contact angles.

FIG. 12 is a graph showing the relationship between the contact angles and the days of immersing the coating films in water with respect to Sample 1 (indicated by rhombuses) and Sample 2 (indicated by boxes) and Comparative Sample 1 (indicated by circles) and Comparative Sample 2 (indicated by triangles). As shown in the figure, water repellencies of Sample 1 and Sample 2 do not sharply decrease with time when compared with those of Comparative Sample 1 and Comparative Sample 2. That is, Sample 1 maintains high contact angles and keeps its stability against water for the long term, compared with the other samples. In addition, the initial water repellency of Sample 2 is lower than that of Comparative Sample 1. However, the water repellency of Sample 2 does not sharply decrease with the time as compared with that of Comparative Sample 1.

Coating films of Samples 1 and 2 and Comparative Examples 1 and 2 are prepared by applying their respective coatings on substrates, respectively.

Each of the coatings which are tetrafluoroethylene resin/silicone resin mixtures is subjected to the measurement for ice-coating shearing force. The measurement is repeated five times for each sample and the mean value of five results is obtained and listed in the following table 4.

TABLE 4

| Paint film | Ice-coating shearing force (gf/cm$^2$) |
|---|---|
| Sample 1 | 112 |
| Sample 2 | 205 |
| Comparative Sample 1 | 552 |
| Comparative Sample 2 | 381 |

Figure 13:
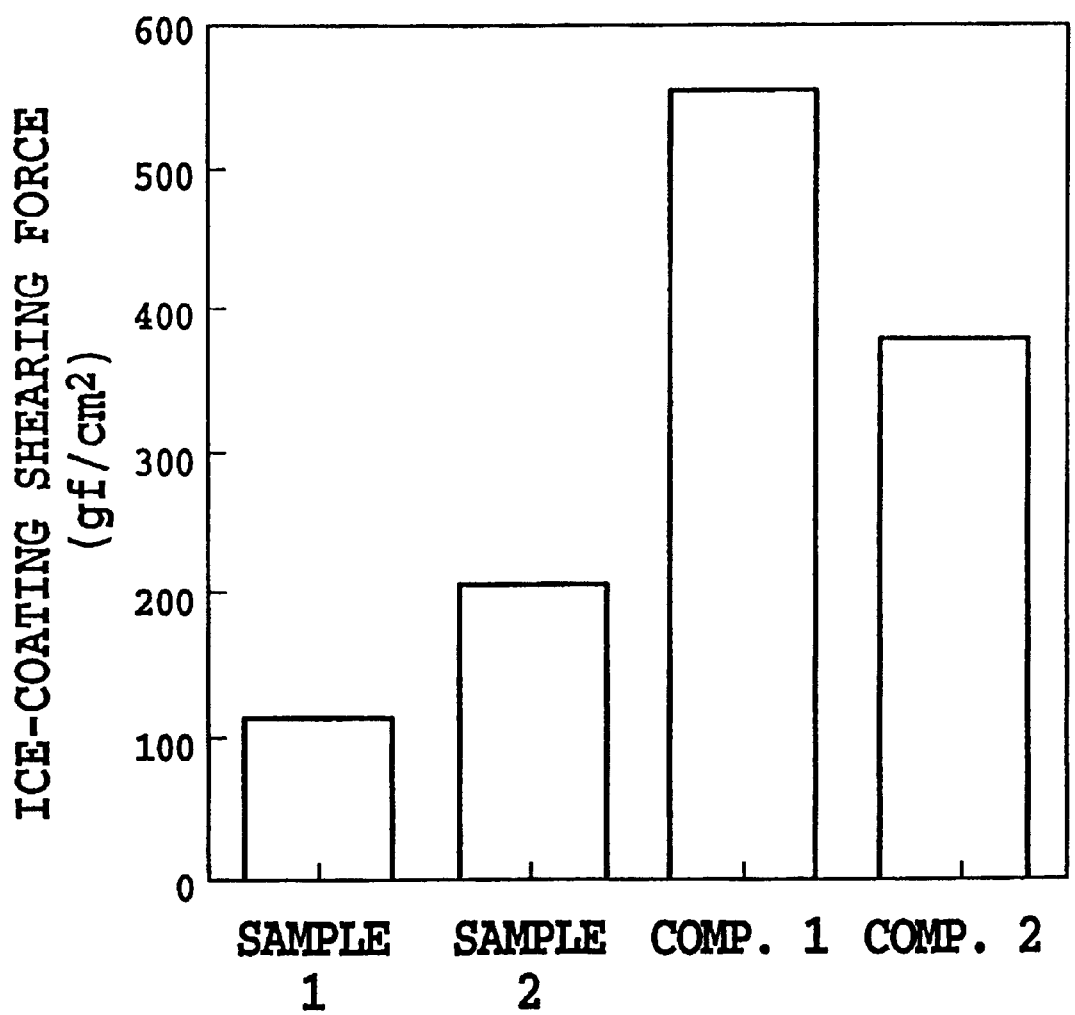
FIG. 13 is a graph representing the ice-coating shearing forces of the coating films prepared as Sample 1, Sample 2, Comparative Sample 1, and Comparative Sample 2, respectively.

The results are also represented in FIG. 13 so as to show data in a visual form.

The coating films of Samples 1 and 2 have small shearing forces as compared with those of Comparative Samples 1 and 2. It means that the present embodiments provide coating films having excellent properties in relation to the conventional coating films comprising polyvinylidene fluoride resin binders.

EXAMPLE 3

A coating of the present example is prepared by the following steps and provided as Sample 3.

The following two constituents are mixed together using motor mill to prepare a pre-dispersed composition:
(1) PTFE resin powder (a peak ratio=0.01) having a mean molecular weight of 5,000 and a mean particle size of 0.88 µm with a high level of fluorination of terminal group; and
(2) a mixed organic solvent (surface tension of 19.0 dyne/cm and specific gravity of 0.83 at 25° C.) comprising n-heptane and fluorinated solvent CFC-225ca at a weight ratio of 5 to 1.

Then, a polyorganosiloxane resin is added and dispersed in the pre-dispersed composition to obtain a final product as a coating (Sample 3).

The resulting coating comprises:
30% of solids and 70% of the mixed organic solvent, specified by weight-percentage concentrations.
Also, the solids in the coating comprises:
50% of the PTFE resin powder and 50% of the silicone resin binder, specified by volume-percentage concentrations.
Furthermore, the rate of change in specific gravity of the coating is 5.0%.

The coating is dip-coated on an aluminum substrate to form a coating film. The contact angle which the coating film forms with the aluminum substrate is 153° and the ice-coating shearing force is 57 gf/cm$^2$, and the arithmetical mean surface roughness is 1.4 µm.

Comparative Example 3

The same PTFE resin powder as that of Sample 3 is mixed with toluene (surface tension of 28.4 dyne/cm and specific gravity of 0.86 at 25° C.) by a motor mill to obtain a pre-dispersed composition. Then, a polyorganosiloxane resin is added and dispersed in the pre-dispersed composition to obtain a final product as a coating (Comparative Sample 3). The water-repellent powder is difficult to conform to the solvent because the surface tension of the solvent used in Comparative Example 3 is considerably larger than that of the solvent used in Sample 3. Thus, the coating captures a large amount of air bubbles therein.

Furthermore, the rate of change in specific gravity of the coating is 37.2%.

The coating is dip-coated on an aluminum substrate to form a coating film. In this case, however, a resulting coating film had a lot of asperities like a sponge. The contact angle which the coating film forms with the aluminum substrate is 153° and the arithmetical mean surface roughness is 10.2 µm.

Comparative Example 4

The same PTFE resin powder as that of Sample 3 is mixed with the same mixed organic solvent as that of Sample 3 (surface tension of 19.0 dyne/cm and specific gravity of 0.83 at 25° C.) by a motor mill to obtain a pre-dispersed composition. Then, a polyorganosiloxane resin is added and dispersed in the pre-dispersed composition to obtain a final product as a coating (Comparative Sample 4).

The resulting coating comprises:
10% of solids and 90% of the mixed organic solvent, specified by weight-percentage concentrations.
Also, the solids in the coating comprises:
50% of the PTFE resin powder and 50% of the silicone resin binder, specified by volume-percentage concentrations.
Furthermore, the rate of change in specific gravity of the coating is 0.1%.

The solids percentage of the coating is smaller than that of Sample 3. The coating is dip-coated on an aluminum substrate to form a coating film. The viscosity of the coating is low, so that the solids tend to drop into the applied coating by its own weight. Consequently, the coating film that has a lot of imperfections therein. The contact angle which the coating film forms with the aluminum substrate is 105°.

Comparative Example 5

The same PTFE resin powder as that of Sample 3 is mixed with the same mixed organic solvent as that of Sample 3 (surface tension of 19.0 dyne/cm and specific gravity of 0.83 at 25° C.) by a motor mill to obtain a pre-dispersed composition. Then, a polyorganosiloxane resin is added and dispersed in the pre-dispersed composition to obtain a final product as a coating (Comparative Sample 5).

The resulting coating comprises:
45% of solids and 55% of the mixed organic solvent, specified by weight-percentage concentrations.
Also, the solids in the coating comprises:
50% of the PTFE resin powder and 50% of the silicone resin binder, specified by volume-percentage concentrations.
Furthermore, the rate of change in specific gravity of the coating is 35.2%.

The coating is dip-coated on an aluminum substrate to form a coating film. In this case, however, the resulting coating film has a lot of asperities like a sponge. The contact angle which the coating film forms with the aluminum substrate is 151° and the arithmetical mean surface roughness is 9.8 µm.

Comparative Example 6

The same PTFE resin powder as that of Sample 3 is mixed with the same mixed organic solvent as that of Sample 3 (surface tension of 19.0 dyne/cm and specific gravity of 0.83 at 25° C.) by a motor mill to obtain a pre-dispersed composition. Then, a polyorganosiloxane resin is added and dispersed in the pre-dispersed composition to obtain a final product as a coating (Comparative Sample 6).

The resulting coating comprises:
30% of solids and 70% of the mixed organic solvent, specified by weight-percentage concentrations.
Also, the solids in the coating comprises:
10% of the PTFE resin powder and 90% of the silicone resin binder, specified by volume-percentage concentrations.

In this sample, furthermore, the ratio of the PTFE resin to the silicone resin binder is smaller than that of Sample 3. The coating is dip-coated on an aluminum substrate to form a coating film. The contact angle which the coating film forms with the aluminum substrate is 111°.

Comparative Example 7

The same PTFE resin powder as that of Sample 3 is mixed with the same mixed organic solvent as that of Sample 3 (surface tension of 19.0 dyne/cm and specific gravity of 0.83 at 25° C.) by a motor mill to obtain a pre-dispersed composition. Then, a polyorganosiloxane resin is added and dispersed in the pre-dispersed composition to obtain a final product as a coating (Comparative Sample 7).

The resulting coating comprises:
30% of solids and 70% of the mixed organic solvent, specified by weight-percentage concentrations.

Also, the solids in the coating comprises:

60% of the PTFE resin powder and 40% of the silicone resin binder, specified by volume-percentage concentrations.

In this sample, furthermore, the ratio of the PTFE resin to the silicone resin binder is larger than that of Sample 3. The coating is dip-coated on an aluminum substrate to form a coating film. Consequently, the contact angle which the coating film forms with the aluminum substrate is 153°, the ice-coating shearing force is 152 μf/cm², and the arithmetical mean surface roughness is 9.8 μm.

The results of evaluating the properties of coatings and coating films of Example 3 and Comparative Examples 3 to 7 are listed in Table 5 and Table 6. The rate of change in specific gravity and arithmetical mean surface roughness of each of Comparative Samples 3 and 5 are larger than those of Sample 3. Also, contact angles of Comparative Examples 4 and 6 are smaller than that of Example 3. In addition, the arithmetical mean surface roughness of Comparative Sample 7 is larger than that of Example 3. Therefore, we find that Sample 3 has all the excellent properties of the rate of change in specific gravity, arithmetical mean surface roughness, and contact angle.

TABLE 5

|  | PTFE resin powder in solids (vol. %) | Solids in Paint (wt. %) | Surface tension of solvent (dyne/cm) | Defoaming treatment |
|---|---|---|---|---|
| Exp. 3 | 50 | 30 | 19 | No |
| Comp. 3 | 50 | 30 | 28.4 | No |
| Comp. 4 | 50 | 10 | 19 | No |
| Comp. 5 | 50 | 45 | 19 | No |
| Comp. 6 | 10 | 30 | 19 | No |
| Comp. 7 | 60 | 30 | 19 | No |

TABLE 6

|  | Rate of change in specific gravity (%) | Contact angle (deg) | arithmetical mean surface roughness (μm) | Shearing force (gf/cm²) |
|---|---|---|---|---|
| Exp. 3 | 5 | 153 | 1.4 | 57 |
| Comp. 3 | 37.2 | 153 | 10.2 | — |
| Comp. 4 | 0.1 | 105 | 0.3 | — |
| Comp. 5 | 35.2 | 151 | 9.8 | — |
| Comp. 6 | — | 111 | — | — |
| Comp. 7 | — | 153 | 9.8 | 152 |

EXAMPLE 4

A coating of the present embodiment is prepared by the following steps and provided as Sample 4.

The following two constituents are mixed together using motor mill to prepare a pre-dispersed composition:

(1) PTFE resin powder (a peak ratio=0.01) having a mean molecular weight of 5,000 and a mean particle size of 0.88 μm with a high level of fluorination of terminal group; and (2) a mixed organic solvent (surface tension of 19.0 dyne/cm and specific gravity of 0.83 at 25° C.) comprising n-heptane and fluorinated solvent CFC-225ca at a weight ratio of 5 to 1.

Then, a polyorganosiloxane resin is added and dispersed in the pre-dispersed composition to obtain a dispersed composition. The dispersed composition is subjected to a de-foaming treatment. The de-foaming treatment comprises the steps of pouring 300 ml of the dispersed composition in a one-liter vessel, placing the vessel in a desiccator, decompressing the desiccator to 60 mmHg for about 5 minutes, and keeping the vessel under a reduced pressure for 5 minutes to obtain a coating.

The resulting coating comprises:

30% of solids and 70% of the mixed organic solvent, specified by weight-percentage concentrations.

Also, the solids in the coating comprises:

50% of the PTFE resin powder and 50% of the silicone resin binder, specified by volume-percentage concentrations.

Furthermore, the rate of change in specific gravity of the coating is 4.2%.

The coating is dip-coated on an aluminum substrate to form a coating film. A contact angle which the coating film forms with the aluminum substrate is 153° and the arithmetical mean surface roughness is 0.9 μm.

As described above, Sample 4 is prepared by performing the de-foaming treatment on Sample 3. As is evident from the measurement values, the rate of change in specific gravity and arithmetical mean surface roughness are further improved by performing the de-foaming treatment on Sample 3.

EXAMPLE 5

A coating of the present embodiment is prepared by the following steps and provided as Sample 5.

The same PTFE resin powder as that of Sample 3 is mixed with toluene (surface tension of 28.4 dyne/cm and specific gravity of 0.86 at 25° C.) by a motor mill to obtain a pre-dispersed composition. Then, a polyorganosiloxane resin is added and dispersed in the pre-dispersed composition to obtain a dispersed composition as a coating. The dispersed composition is subjected a de-foaming treatment in which 300 ml of the dispersed composition is poured in a one-liter vessel. After that, the vessel is replaced in a desiccator and decompressed to 60 mmHg for about 5 minutes. Subsequently, the vessel is kept under a reduced pressure for 5 minutes to obtain a coating.

The coating of Example 5 has the same formulation as that of Comparative Example 3 except that a de-foaming treatment is performed so as to remove air bubbles, resulting that the rate of change in specific gravity of the coating is 7.3%. The coating is dip-coated on an aluminum substrate to form a coating film. Consequently, the contact angle which the coating film forms with the aluminum substrate is 152° and the arithmetical mean surface roughness is 1.5 μm.

As the sample subjected to a de-foam treatment, Sample 5 shows almost the same contact angle and arithmetical mean surface roughness as those of Sample 3 except that the rate of change in specific gravity of Sample 5 is slightly larger than that of Sample 3 in spite of using the organic solvent having a surface tension higher than that of Sample 3.

The results of evaluating the properties of coatings and coating films of Examples 3 to 5 and Comparative Example 3 are listed in Table 7 and Table 8.

TABLE 7

|  | PTFE resin powder in solids (vol. %) | Solids in Paint (wt. %) | Surface tension of solvent (dyne/cm) | Defoaming treatment performed |
|---|---|---|---|---|
| Exp. 3 | 50 | 30 | 19 | No |
| Exp. 4 | 50 | 30 | 19 | Yes |
| Exp. 5 | 50 | 30 | 28.4 | Yes |
| Comp. 3 | 50 | 30 | 28.4 | No |

TABLE 8

|  | Rate of change in specific gravity (%) | Contact angle (deg) | Arithmetical mean surface roughness ($\mu$m) |
|---|---|---|---|
| Exp. 3 | 5 | 153 | 1.4 |
| Exp. 4 | 4.2 | 153 | 0.9 |
| Exp. 5 | 7.3 | 152 | 1.5 |
| Comp. 3 | 37.2 | 153 | 10.2 |

EXAMPLE 6

A coating of the present embodiment is prepared by the following steps and provided as Sample 6.

The same PTFE resin powder as that of Sample 3 is mixed with the same mixed organic solvent as that of Sample 3 (surface tension of 19.0 dyne/cm and specific gravity of 0.83 at 25° C.) by a motor mill to obtain a pre-dispersed composition. Then, a polyorganosiloxane resin is added and dispersed in the pre-dispersed composition to obtain a dispersed composition as a coating. The dispersed composition is subjected to a de-foaming treatment in which 300 ml of the dispersed composition is poured in a one-liter vessel. After that, the vessel is replaced in a desiccator and decompressed to 60 mmHg for about 5 minutes. Subsequently, the vessel is kept under a reduced pressure for 5 minutes to obtain a coating.

The resulting coating comprises:

45% of solids and 55% of the mixed organic solvent, specified by weight-percentage concentrations.

Also, the solids in the coating comprises:

50% of the PTFE resin powder and 50% of the silicone resin binder, specified by volume-percentage concentrations.

Furthermore, the rate of change in specific gravity of the coating is 6.3% as a result of removing air bubbles by performing the de-foaming treatment.

The coating is dip-coated on an aluminum substrate to form a coating film.

The contact angle which the coating film forms with the aluminum substrate is 155° and the arithmetical mean surface roughness is 1.2 $\mu$m.

The results of evaluating the properties of coatings and coating films of Example 6 and Comparative Example 5 are listed in Table 9 and Table 10.

As the sample 6 is prepared by subjecting Comparative Example 5 to the de-foam treatment, the proportion of solids to the coating of Sample 6 is larger than that of Comparative Sample 5. In addition, Sample 6 shows almost the same contact angle and arithmetical mean surface roughness as those of Sample 3 except that the rate of change in specific gravity of Sample 6 is slightly larger than that of Sample 3.

TABLE 9

|  | PTFE resin powder in solids (vol. %) | Solids in Paint (wt. %) | Surface tension of solvent (dyne/cm) | Defoaming treatment performed |
|---|---|---|---|---|
| Exp. 6 | 50 | 45 | 19 | Yes |
| Comp. 5 | 50 | 45 | 19 | No |

TABLE 10

|  | Rate of change in specific gravity (%) | Contact angle (deg) | Arithmetical mean surface roughness ($\mu$m) |
|---|---|---|---|
| Exp. 6 | 6.3 | 155 | 1.2 |
| Comp. 5 | 35.2 | 151 | 9.8 |

In the above examples, preferred PTFE resin powder, silicone resin binders, organic solvents are explained in detail. However, the present invention has been described in detail with respect to preferred embodiments, and it will now be that changes and modifications in peak ratio of PTFE resin, composition of silicon resin, types of organic solvent, solids fraction, rate of change in specific gravity, de-foaming treatment, or the like maybe made without departing from the invention, therefore, in the appended claims to cover all such changes and modifications as fall within the true spirit of the invention. In addition, it is confirmed that a coating film obtained using a brush-coating has the same characteristics as those of the paint films of Examples described above.

Accordingly, a coating and a coating film of the present invention is based on a mixture of tetrafluoroethylene resin and silicone resin in addition to use an appropriately selected organic solvent and preferably to use the predetermined proportions of constituents in the paint. In addition, a de-foaming treatment is performed during the steps of forming the paint. Therefore, the coating film formed on a substrate has the properties of high water repellency, excellent anti-ice-coating, excellent anti-snow-coating, and so on, regardless of whether the coating film is dipped into water for a long time, in spite of without comprising a large amount of fluororesin powder. By the way, it is difficult to make a coating film having good film properties by means of dip-coating or brush-coating. By preparing a coating by the process including the step of de-foaming treatment, however, the coating provides an excellent smooth surface of a coating film when it is applied on a substrate by means of dip-coating or brush coating. Thus, the coating can be applied on a complex structure or at a place where a fine spray of the coating should not be released into the air.

The present invention has been described in detail with respect to preferred embodiments, and it will now be apparent from the foregoing to those skilled in the art that changes and modifications may be made without departing from the invention in its broader aspect.

What is claimed is:

1. A water-repellent coating composition having a specific gravity and a theoretical specific gravity, comprising:

tetrafluoroethylene resin powder;

silicone resin binder; and organic solvent, wherein the tetrafluoroethylene resin powder has a peak of an infrared absorption spectrum absorbance approximately at 1,800 cm$^{-1}$ and a peak absorbance approximately at 500 cm$^{-1}$ where the ratio of the peak absorbance at 1,800 cm$^{-1}$ to the peak absorbance at 500 cm$^{-1}$ is from 0.0001 to 0.05 exclusive, and wherein said composition also exhibits anti-ice and anti-snow characteristics.

2. A water-repellent coating composition as claimed in claim 1, wherein:

the silicone binder is one selected from a group consisting of polyorganosiloxane, fluorinated polyorganosiloxane, and a mixture thereof.

3. A water-repellent coating composition as claimed in claim 1, wherein:

the organic solvent is one selected from the group consisting of: alcohol solvents, aromatic solvents, aliphatic solvents, and mixtures thereof.

4. A water-repellent coating composition as claimed in claim 1, wherein:

the organic solvent is one selected from the group consisting of: fluoro solvents, hydrocarbon solvents, ketone solvents, and mixtures of at least two of these solvents.

5. A water-repellent coating composition as claimed in claim 1, wherein the solid content consisting of the tetrafluoroethylene resin powder and the silicone resin binder constitutes 20 to 40% by weight and the organic solvent constitutes 60 to 80% by weight, on a base of a total weight of the water-repellent coating.

6. A water-repellent coating composition as claimed in claim 5, wherein the silicone binder is one selected from the group consisting of polyorganosiloxane, fluorinated polyorganosiloxane and a mixture thereof, the organic solvent has a surface tension of 16–22 dyne/cm and a specific gravity of 0.60–1.6 at 25° C. and wherein the specific gravity of the whole coating relative to the theoretical specific gravity of the whole coating differs by less than 10%.

7. A water-repellent coating composition as claimed in claim 1, which has been defoamed.

8. A water-repellent coating composition as claimed in claim 7, wherein the specific gravity of the whole coating relative to the theoretical specific gravity of the whole coating differs by less than 10%.

9. A water-repellent coating composition as claimed in claim 7, wherein the solid content consisting of the tetrafluoroethylene resin powder and the silicone resin binder constitutes 20 to 50% by weight and the organic solvent constitutes 50% to 80% by weight, on a base of a total weight of the water-repellent coating.

10. A water-repellent coating composition as claimed in claim 1, wherein the solid content consisting of the tetrafluoroethylene resin powder and the silicone resin binder constitutes 20 to 50% by weight and the organic solvent constitutes 50 to 80% by weight, on the basis of a total weight of the water-repellent coating and wherein the silicone binder is one selected from the group consisting of polyorganosiloxane, fluorinated polyorganosiloxane and mixture thereof, the organic solvent has a surface tension of 16–22 dyne/cm and a specific gravity of 0.60–1.6 at 25° C. and wherein the specific gravity of the whole coating relative to the theoretical specific gravity of the whole coating differs by less than 10%.

11. A substrate having a water-repellent coating film which also exhibits anti-ice and anti-snow characteristics thereon, wherein the film is a dried coating composition as claimed in claim 9.

12. A substrate having a water-repellent coating film which also exhibits anti-ice and anti-snow characteristics thereon, wherein the film is a dried coating composition as claimed in claim 8.

13. A substrate having a water-repellent coating film which also exhibits anti-ice and anti-snow characteristics thereon, wherein the film is a dried coating composition as claimed in claim 7.

14. A substrate having a water-repellent coating film which also exhibits anti-ice and anti-snow characteristics thereon, wherein the film is a dried coating composition as claimed in claim 5.

15. A substrate having a water-repellent coating film which also exhibits anti-ice and anti-snow characteristics thereon, wherein the film is a dried coating composition as claimed in claim 4.

16. A substrate having a water-repellent coating film which also exhibits anti-ice and anti-snow characteristics thereon, wherein the film is a dried coating composition as claimed in claim 3.

17. A substrate having a water-repellent coating film which also exhibits anti-ice and anti-snow characteristics thereon, wherein the film is a dried coating composition as claimed in claim 2.

18. A substrate having a water-repellent coating film which also exhibits anti-ice and anti-snow characteristics thereon, wherein the film is a dried coating composition as claimed in claim 1.

* * * * *